(12) United States Patent
Root, Jr.

(10) Patent No.: US 7,602,478 B2
(45) Date of Patent: Oct. 13, 2009

(54) FUSED SENSOR SITUATION DISPLAY

(75) Inventor: George Raymond Root, Jr., Gambrills, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 177 days.

(21) Appl. No.: 11/944,393

(22) Filed: Nov. 21, 2007

(65) Prior Publication Data

US 2009/0128399 A1    May 21, 2009

(51) Int. Cl.
*G01C 3/08* (2006.01)
(52) U.S. Cl. .................. 356/5.04; 342/176; 348/166
(58) Field of Classification Search ................ 356/5.01; 342/176
See application file for complete search history.

(56) References Cited

U.S. PATENT DOCUMENTS

| | | | |
|---|---|---|---|
| 6,542,227 B2* | 4/2003 | Jamieson et al. | 356/28.5 |
| 7,266,207 B2* | 9/2007 | Wilcock et al. | 381/310 |
| 2006/0021498 A1* | 2/2006 | Moroz et al. | 89/41.06 |

* cited by examiner

*Primary Examiner*—Thomas H Tarcza
*Assistant Examiner*—Timothy A Brainard
(74) *Attorney, Agent, or Firm*—DeMont & Breyer, LLC

(57) ABSTRACT

A method for providing an observer with an intuitive awareness of a tactical environment is disclosed. In an illustrative embodiment, the method displays a 360° panoramic view of the environment surrounding a warship, wherein the view is augmented by radar data, infrared imagery, visible imagery, and tactical information about targets within the field-of-view.

40 Claims, 4 Drawing Sheets

FUSED SENSOR SITUATION DISPLAY

FIELD OF THE INVENTION

The present invention relates to command and control displays in general, and, more particularly, to radar displays, electro-optical sensor displays and infrared sensor displays.

BACKGROUND OF THE INVENTION

In modern warfare, command and control (C2) systems are found in warships, aircraft, tanks, and other land vehicles. These C2 systems are used for, among other things, the deployment of friendly assets and control of sensors and weaponry during military operations. A typical C2 system includes processing elements, communications elements, and control elements that use a variety of displays to provide information about a tactical environment to several observers. Each observer may monitor one aspect (or a few aspects) of the overall tactical situation and communicate about that aspect to the other observers, thereby cooperatively developing "community" awareness that leads to a tactical decision.

In a large set-piece military operation, such as a battle between large warships, C2 systems such as these may suffice. Increasingly, however, asymmetrical threats platforms such as high speed small boats are replacing traditional larger warships and attacks by these smaller threat platforms have become commonplace. In some asymmetrical battles, a coordinated attack by a large group of high-speed small boats may be used to overwhelm the defenses of a larger, more powerful naval foe. Such attacks can take place while the defending platform is moving and the normal C2 personnel are manning their control stations. Alternatively, an asymmetrical attack can take place while the defended platform is stationary, during which time weapons, sensors, and C2 systems may be manned at a reduced level. Reduced manning status might occur, for example, when the defended platform is in port and anchored or tied to a pier.

To further complicate matters, new tactical and strategic sensing systems are being used to provide an ever-increasing amount of information to the personnel manning the C2 center. A tactical decision now relies on information from multiple sources on-board a host warship (i.e., the warship which contains the command and control system). On-board sources include low- and high-resolution infrared (IR) sensors, forward looking infrared (FLIR) sensors, low and high resolution Electro-optical (EO) visual spectrum sensors, Radars, Ladars, and Electronic Signal Monitoring (ESM) devices. Information is also provided by sensing systems located external to the host warship. External sources include friendly vessels, shore based observers, Unmanned Aerial Vehicles (UAV's), Unmanned Surface Vehicles (USV's), satellites and other intelligence assets.

The tactical decision making process using a conventional C2 system is complicated by the challenges of observing, organizing, and distributing all the available sensing information and developing a coherent and manageable view of the tactical environment. The timely observation and collation of the information necessary to make tactical decisions is further complicated when there is a reduced number of C2 personnel available (e.g., in a minimal manning situation).

Once the tactical situation has been assessed and tactical decisions have been made, it is equally difficult with the current C2 systems to reliably disseminate both the decisions and the resulting action assignments necessary to effectively engage and defeat the attackers. In the case of a significant number of attacking small boats, the sensing process would be a near continuum of detection, identification, tracking, targeting, engagement, and engagement assessment events that would quickly overload the C2 center's capability to defend the host warship.

It is desirable, therefore, to provide a means for rapidly developing and displaying an intuitive awareness of an overall tactical situation that would enable the C2 personnel to more quickly and reliably make and disseminate tactical decisions.

SUMMARY OF THE INVENTION

The present invention enables an operator and/or observer to gain an intuitive and rapid understanding of the tactical situation surrounding a tactical platform or point-of-interest, such as a warship, aircraft, fixed installation, or motor vehicle. For example, embodiments of the present invention are particularly well-suited for providing an operator/observer to command and control defense assets in the face of an attack by a large number of fast attack craft, such as fast gun boats.

In conventional prior art C2 systems, on-board and off-board sensing systems typically transmit sensor information to the defended platform over separate communications links. This sensor information is displayed on separate tactical displays, each of which displays information from only a single sensing system. As a result, overall sensing information is distributed over several displays, which are often physically displaced from each other. This plurality of screens is typically monitored by multiple operators/observers. Since these observers receive sensor information in piecemeal fashion, communications between them is necessary to develop a composite sense of the surrounding environment. Such communication can be difficult in the often chaotic, confused, and noisy environment of a battle, however. Mistakes, such as firing a weapon at a neutral or friendly contact, therefore, can easily be made.

Prior art command and control systems also rely predominantly on "plan map" displays, which provide an observer a view from above the tactical environment (i.e., looking down). In order to distinguish the radar track of any one contact from another in a crowded area of the display, the observer must zoom in on that area of the display. As a result, activity outside the immediate area of interest is often lost to the observer.

Embodiments of the present invention, like the prior art, display multiple sensor information, such as radar data, ESM data, high and low resolution FLIR, Information Friend or Foe (IFF) data and visual spectrum information about the environment that surrounds the warship. In contrast to the prior art, however, the current invention presents the observer with a single multi-view integrated panoramic view of the environment that surrounds the warship with each of several sensor views correlated in azimuth. This view can be thought of as the view that would be perceived by a single observer positioned at the top of the ship's mast (i.e. in the "Crow's Nest"). In accordance with the present invention, a single observer has access to an instantaneous, 360 degree view of the ship's environment. This observer is provided a set of sensors that sense across the electromagnetic spectrum from lower frequencies associate with radars and radios up through the infrared and visible light frequencies.

In some embodiments of the present invention, a display provides information from sensors that sense energy from other areas in the electromagnetic spectrum. This integrated view can be displayed in a single display area observable by a single observer or groups of observers. The observers, therefore, are able to quickly develop an intuitive awareness of the tactical situation that surrounds the warship and can thereby assign additional sensors and/or weapons necessary to counter an attack. In some embodiments, the tactical status of both the attackers and the ship's sensor and weapon resources being assigned to counter the attackers are also displayed in the integrated view.

In some embodiments, the present invention combines displays of radar data (the radar view), wide angle electro-optical (EO) data (the EO view), wide angle Infrared (IR) data (the IR view), and images from higher resolution EO and IR sensors. In this fused display, the radar track data, the EO images and the IR images are correlated in azimuth to one another as well as to common azimuth indicators. The range of azimuth displayed on these combined views and the azimuth indicator is selectable for any desired increment of azimuth up to the entire 360 degrees that surrounds the warship. In some embodiments, tactical information pertaining to the host platform's tactical situation, such as ESM activity, intelligence defined areas of interest, and the like, is displayed graphically or alphanumerically. In some embodiments, radar or EO/IR information regarding the physical environment such as land masses, coast lines, and political boundaries is displayed. In some embodiments, the pointing angles, orientation, and engagement status of tactical assets such as missile launchers, guns, laser designators, and sensors are displayed in, for example, the radar, EO, or IR views of the display.

In some embodiments, instantaneous fields of regard (magnification) of select sensors, such as high resolution EO and IR sensors, are rendered in the display to help orient the users of those higher resolution displays and to further augment tactical awareness. In some embodiments, the pointing angle and field of regard of high resolution sensors are graphically controlled using an operator controlled cursor on a display. In some embodiments, the cursor is used to move or resize the displayed field of regard of a sensor which in turn slews the physical sensor and/or changes the sensor's magnification. This enables an operator to control several high resolution sensors at one time.

In some embodiments, the radar view, EO view, IR view, and azimuth indicator are oriented to the physical orientation of the ship. For example, the center of the display is oriented to the bow of the warship, the right side of the display presents information about contacts located on the starboard side of the ship, and the left side of the display presents information about contacts on the port side of the ship. In some embodiments, the azimuth indicator is aligned to geographic true north or magnetic north. In some embodiments, all three azimuth indicators (relative, true, and magnetic) are displayed. In some embodiments, the instantaneous heading of the ship is displayed on the azimuth indicator along with other tactically significant parameters such as ship's speed, wind direction, or local sea current direction.

The present invention, therefore, enables a single observer to rapidly obtain an intuitive awareness of a more complete tactical situation surrounding the ship. The speed at which command and control decisions can be made is thereby improved as compared to conventional prior art tactical displays. In addition, the present invention can obviate the need for inter-personnel communication that can also contribute to command errors.

An embodiment of the present invention comprises a method comprising: displaying an azimuth indicator, wherein the azimuth indicator spans a range of azimuths that corresponds to a field-of-interest, and wherein the range of azimuths is substantially continuous; providing a first display area for displaying a view of the field-of-interest, wherein the view comprises information provided by at least one electro-optic sensor selected from the group consisting of cameras sensitive to visible light and cameras sensitive to infrared light; providing a second display area for displaying a contact indicator for each of one or more contacts within the field-of-interest; and spatially correlating the azimuth indicator, first display area, and second display area.

DETAILED DESCRIPTION

The following terms are defined for use in this Specification, including the appended claims:
  azimuth means the horizontal component of a direction, measured clockwise around the horizon, from a reference direction.
  radar image means a rendering of information provided by radar equipment. Such information may include range and azimuth information for: (1) substantially stationary contacts, such as land masses, weather formations, military installations, civilian installations, and the like; and (2) non-stationary contacts, such as aircraft, ships, motor vehicles, personnel, and the like.
  radar data means location, direction, speed, and/or track of a contact or each of a set of contacts.
  tactical information means information about a contact. Tactical information includes one or more of the following: a contact's track history, a contact's threat level, a contact's weaponry, historical group-related activity of a contact, historical information for a contact, a contact's track history relative to track histories of other contacts, a contact's track history relative to the point-of-interest, and the like. Tactical information can also include other information deemed pertinent by those of ordinary skill in the art. Historical information includes one or more of the following: photographs taken of the contact and the times at which they were taken, a contact's geographical position when designated hostile, a contact's photo history, and the like. Historical information can also include other information deemed pertinent by those of ordinary skill in the art.
  contact means a moving or fixed object that emits thermal or other radiation, reflects light or other energy, or reflects radio waves generated by a radar or other energy wave transmitter, thereby generating an EO, IR, or radar contact or radar track. Examples of contacts include, without limitation, aircraft, ships, motor vehicles, weather formations, terrain, buildings, and the like.

Figure 1:
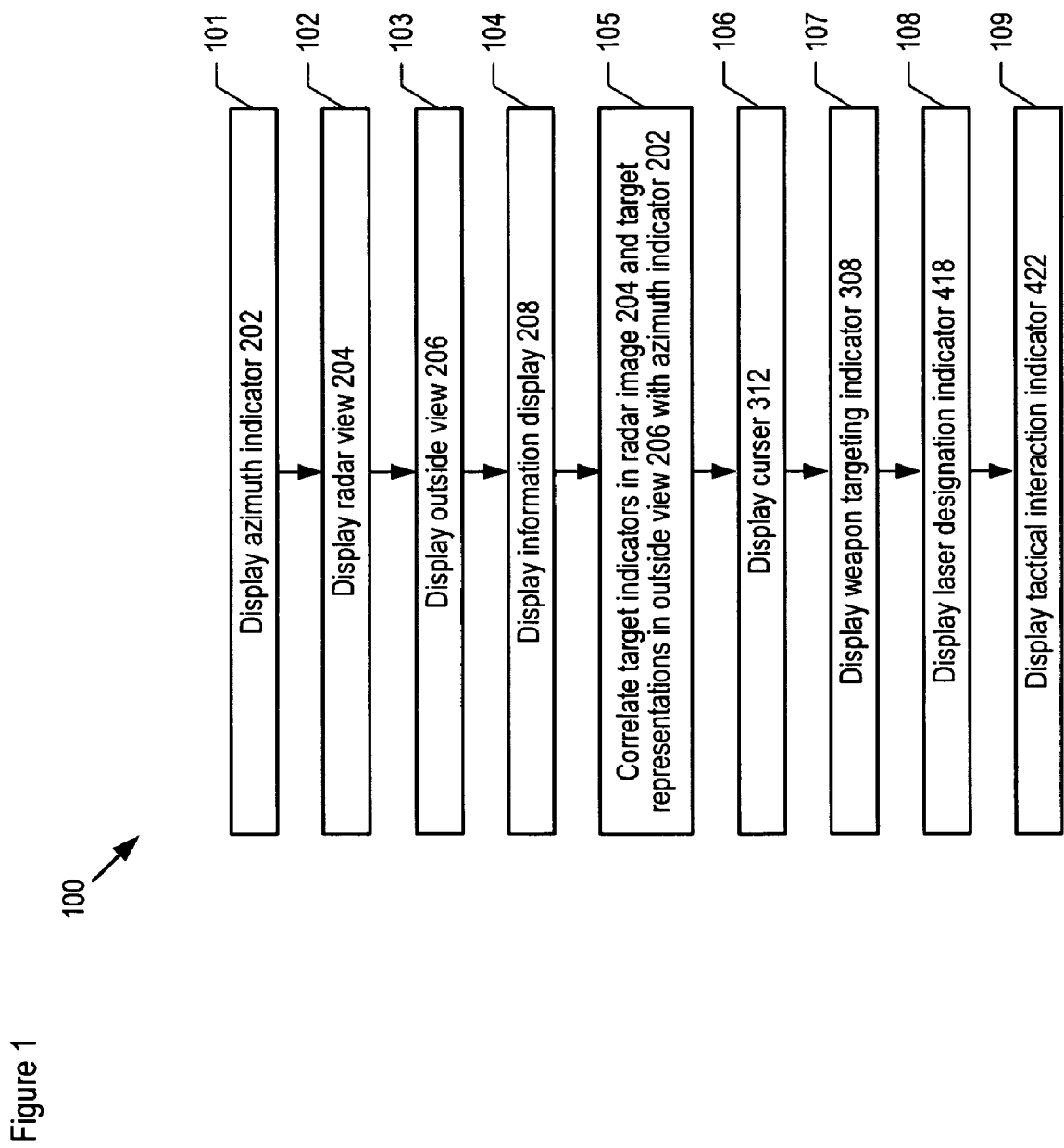
FIG. 1 depicts a method for displaying information in accordance with an illustrative embodiment of the present invention.

FIG. 1 depicts a method for displaying information in accordance with an illustrative embodiment of the present invention. Method 100 comprises operations suitable for providing correlated information in a fused sensor display. Method 100 is described herein with reference to FIGS. 2-5.

Figure 2:
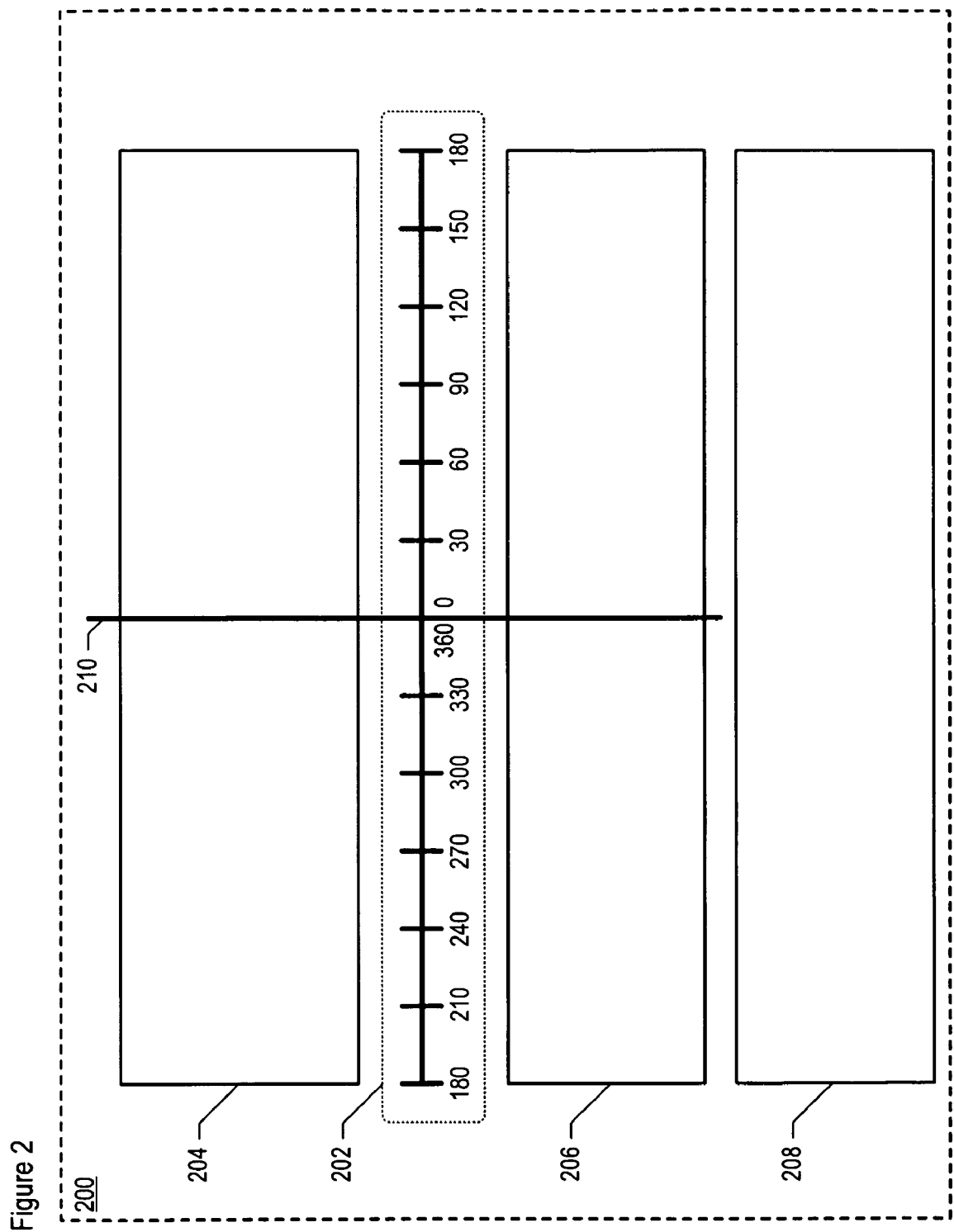
FIG. 2 depicts a schematic diagram of a fused sensor display in accordance with the illustrative embodiment of the present invention.

FIG. 2 depicts a schematic diagram of a fused sensor display in accordance with the illustrative embodiment of the present invention. Fused sensor display 200 provides a single organized display of information pertaining to the physical and intelligence environment that surrounds a warship (i.e., a point-of-interest) so that this information can be instantaneously viewed and understood by as few as a single observer. Fused sensor display 200 comprises azimuth indicator 202, radar view 204, one or more outside views 206, and information display 208. In some alternative embodiments, fused sensor display 200 may not include azimuth indicator 202, radar view 204, outside view 206, and information display 208.

Method 100 begins with operation 101, in which azimuth indicator 202 is displayed. Azimuth indicator 202 is an indicator of the azimuth range of a field-of-interest and is registered to the orientation of the host warship. Bow marker 210 denotes the azimuth that corresponds to the direction of the bow of the host warship, and helps an observer remain oriented to the direction of the host warship. In other words, 0 degrees (and 360 degrees) on azimuth indicator 202 indicates the azimuth aligned to the direction from stern to bow of the host warship, as indicated by bow marker 210.

In like fashion, 180 degrees on azimuth indicator 202 indicates the azimuth aligned to the direction from bow to stern of the host warship. Azimuth indicator 202 is divided into 12 subsections, each of which spans 30 degrees of azimuth. In some alternative embodiments, the azimuth indicator is registered to a direction other than the direction in which the point-of-interest is facing. In some alternative embodiments, azimuth indicator 202 is divided into more or less subsections that each span more or less than 30 degrees.

In some alternative embodiments, the field-of-interest includes an azimuth range that is less than a full circle. For example, the field-of-interest may be limited to azimuths that range from 5 degrees to 10 degrees, 0 degrees to 310 degrees, 1 degree to 2 degrees, etc.

At operation 102, radar view 204 is displayed above and in horizontal alignment with azimuth indicator 202. Radar view 202 is a rendering of the range and azimuth information for contacts within the field-of-interest. In some embodiments, radar view 202 will comprise a contact indicator for each of one or more contacts within the field-of-interest. Radar view 204 is described in more detail below and with respect to FIG. 3.

At operation 103, outside view 206 is displayed below and in horizontal alignment with azimuth indicator 202. Outside view 204 is a display of visual scene of the field-of-interest, taken from the perspective of the host warship. Outside view 204 is analogous to the view from the crow's nest of the warship. Outside view 204 is augmented, however, to include more than just the visual scene as seen by the naked eye from the warship. Outside view 204 comprises information provided by electro-optical (EO) sensors that are operable in the visible light spectrum and the infrared light spectrum. In some embodiments, outside view 204 will comprise a contact image for each of one or more contacts within the field-of-interest. In some alternative embodiments, outside view 204 comprises information provided by sensors operable in only one of the visible light spectrum and infrared light spectrum. Outside view 204 is described in more detail below and with respect to FIG. 4.

At operation 104, information display 208 is displayed below outside view 204. Information display 208 provides areas for displaying information about specific contacts, regions of interest, or other information deemed pertinent by one skilled in the art. Information display 208 is described in more detail below and with respect to FIG. 5.

Radar view 204 and outside view 206 are spatially correlated with azimuth indicator 202. In other words, the spatial correlation of radar view 204, outside view 206, and azimuth indicator 202 means that they are physically aligned such that a vertical line drawn through all three corresponds to the same azimuth. It should be noted that fused sensor display 200 can rotated at any convenient angle such that azimuth indicator 202 is not horizontal. In that case, a straight line drawn through the three display regions, which corresponds to the same azimuth, might not be a vertical line. For example, in some alternative embodiments, the spatial correlation of radar view 204, outside view 206, and azimuth indicator 202 means that they are physically aligned such that a horizontal line drawn through all three corresponds to the same azimuth.

The arrangement of radar view 204, outside view 206, and azimuth indicator 202, all in one display area, provides an observer with an intuitive sense of the environment completely surrounding the host warship. In some alternative embodiments, the order in which these elements are stacked vertically is different (e.g., outside view 206 may be on top, etc.); however, they remain co-located in a single display area having correlated azimuth.

The azimuthal correlation of radar view 204, outside view 206, and azimuth indicator 202 dictates that contact images within these views are azimuthally correlated as well.

Figure 3:
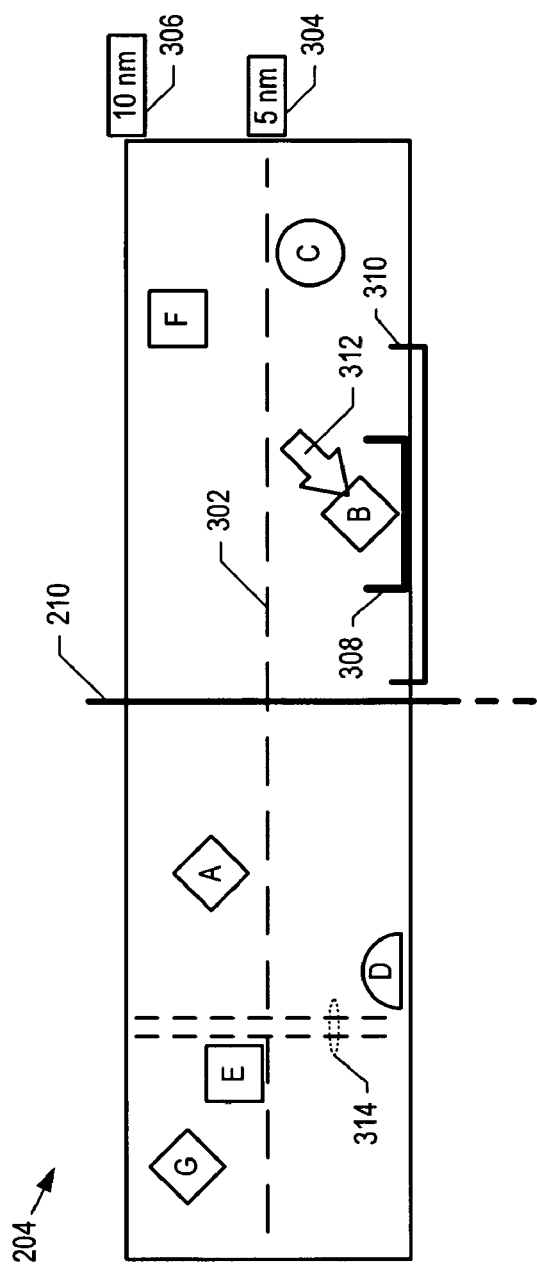
FIG. 3 depicts a schematic diagram of details of radar view 204 in accordance with the illustrative embodiment of the present invention.

FIG. 3 depicts a schematic diagram of details of radar view 204 in accordance with the illustrative embodiment of the present invention. Radar view 204 comprises contact indicators A through G, exclusion zone marker 302, exclusion zone label 304, field-of-interest range label 306, targeting indicator 308, safety marker 310, curser 312, and ESM azimuth indicator 314. Radar view 204 is depicted in relation to bow marker 210.

The field-on-interest of radar view 204 includes the same azimuth range as azimuth indicator 202 and a distance range of 0 nautical miles (nm) to 10 nm from the host warship. In other words, the field-of-interest of radar view 204 is a 20 nm-diameter circle that is centered on the host warship. In some alternative embodiments, the field-of-interest comprises a distance range other than 20 nm.

Electronic support management (ESM) involves the detection and analysis of electronically transmitted signals such as radar or radio transmissions aboard military platforms such as ships of war. The two vertical hatched lines at ESM azimuth indicator 314 in radar view 204 denote the presence of an intercepted ESM signal whose horizontal position in radar view 204 corresponds to the arrival azimuth of the ESM signal to the host warship.

In Radar view 204, a radar contact is displayed as a contact indicator whose horizontal position corresponds to azimuth and vertical direction corresponds to range from the host warship. In FIG. 3, contact indicators A through G indicate radar data received about objects within the field-of-interest. Contact indicators A through G are positioned within radar view 204 at the azimuth and range that corresponds to their respective contacts' positions relative to the host warship. The shape of each of contact indicators A through G denotes the assigned status and/or classification of that contact, such as type of object. For example, the diamond shape of contact indicators A, B, and G denote that their respective contacts are hostile gunboats. The square shape of contact indicators E and F denote that these contacts are non-hostile vessels, such as cargo ships or fishing trawlers. The circular shape of contact indicator C denotes that its classification is unknown. The half-circle shape of contact indicator D indicates that this contact is an airborne contact. It should be noted that these contact indicator shapes are merely examples and other relationships between contact indicator shape and vessel type are possible. Although the illustrative embodiment comprises contact indicators whose shape denotes vessel type, it will be clear to those skilled in the art, after reading this specification, how to make and use alternative embodiments of the present invention wherein contact indicator shape denotes a different contact classification.

Contact indicators A through G are also displayed using a color to denote the level of perceived hostility of their respective contacts. For example, contact indicators A, B, and G are displayed with a red outline to denote that they are known hostile. Contact indicators C and D are displayed with a green outline to denote that they are known friendly vessels. Although the illustrative embodiment comprises contact indicators whose color denotes hostility of a contact, it will be clear to those skilled in the art, after reading this specification, how to make and use alternative embodiments of the present invention wherein color denotes a different contact classification. In some embodiments, alphanumerical characters are displayed near one or more contact indicators in radar view 204 to provide other information, such as contact identity, range, speed, direction, etc.

Exclusion zone marker 302 denotes a user-defined range for exclusion of hostile or unknown vessels. Exclusion zone marker 302 typically designates the half-range point of the field-of-interest, although it can be set to designate any desired range from the host warship. The range at which exclusion zone marker 302 is set is indicated by exclusion zone label 304.

Figure 4:
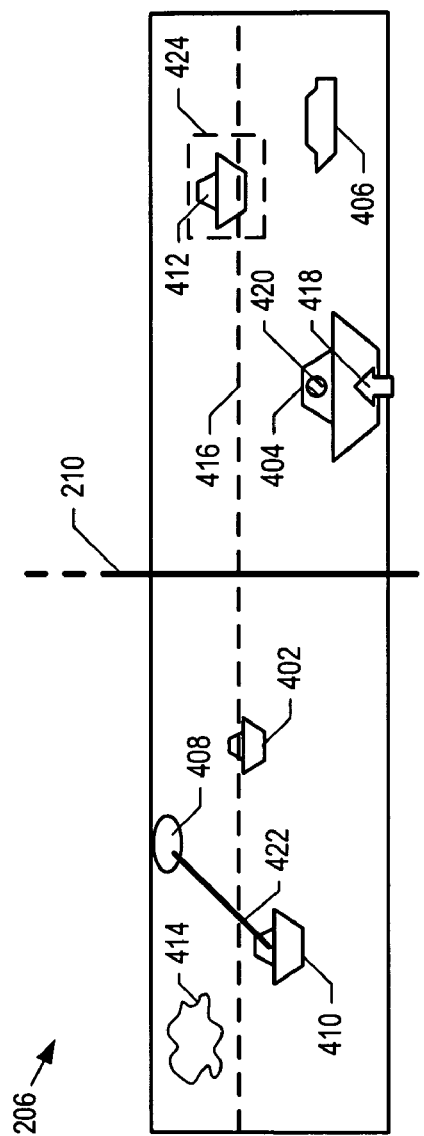
FIG. 4 depicts a schematic diagram of details of outside view 206 in accordance with the illustrative embodiment of the present invention.

FIG. 4 depicts a schematic diagram of details of outside view 206 in accordance with the illustrative embodiment of the present invention. Outside view 206 comprises contact images 402 through 414, sensor field-of-regard 424, horizon indicator 416, laser designation indicator 418, and illuminating laser spot 420. One or more outside views 206 can be included in fused sensor display 200.

Contact images 402 through 414 are images of contacts within the field-of-interest. Contact images 402 through 414 are provided by one or more low-, medium-, or high-resolution electro-optic sensors and/or cameras located on board the host warship, other warships, UAV's and/or USV/s. For any one rendering of an outside view 206, the images from one or more limited field of view sensors sensing in the same frequency band are blended to provide a single image of the total field of interest. These electro-optic sensors can be operable in the visible light, infrared, or other frequency band of the electromagnetic spectrum. For instance, in a single fused sensor display 200, one outside view 206 can be depicting a visible light sensor display and a second outside view 206 can be depicting an infrared sensor display. The two outside views 206 are located in adjacent positions in the fused sensor display 200. Contact images 402 through 414 are azimuth correlated and depicted in both outside views 206 to the extent that they are detectable by the sensors providing imagery to their respective outside views 206. Contact images 402 through 414 are analogous to the images an observer in the crow's nest would see, but are augmented by the breadth of the electromagnetic spectrum capability offered by the electro-optic sensors used to provide outside view 206. In some alternative embodiments, the images from two or more sensors sensing in different frequency bands of the electromagnetic spectrum could be superimposed on one another to render a single outside view 206.

The sensor field-of-regard 424 located in outside view 206 denotes the azimuth and elevation limits of the current field of view of a single medium or high high-resolution electro-optic sensor or camera located on board the host warship. Sensor field of regard 424 provides an operator an improved awareness of where the warship's high resolution sensors are pointing and gives the operator the capability to "zoom in" on a contact image located in the outside view 206 field-of-interest. The size and location of field-of-regard 424 in outside view 206 is operator-definable. In some alternative embodiments, more than one sensor field-of-regard 424 are displayed in a single rendering of outside view 206. In some embodiments, renderings of field-of-regard 424 are graphically distinguished, for example by line color, line weight, line type, graphical highlights, etc.

Horizon indicator 416 denotes the vertical position of the horizon within the field-of-view of outside view 206. Although the natural horizon is frequently depicted in both visible light sensor and infrared sensor displays, certain weather conditions preclude a visible natural horizon and horizon indicator 416 improves the operators perception of the outside environment presented in outside view 206 in those conditions.

At operation 105, the horizontal position of each of contact indicators A through G in radar view 204 is correlated to the horizontal position of each of contact images 402 through 414 in outside view or views 206. Each of the contact indicators and contact images is also correlated to azimuth indicator 202. In other words, each of contact indicators A through G is displayed at the same horizontal position in radar view 204 as its corresponding contact images in outside view 206. For example, contact indicators A, B, and G are displayed at the same horizontal position as contact images 402, 404, and 414. These horizontal positions correspond to azimuths 305, 60, and 210, respectively.

The physical relationship of these features across fused sensor display 200 further enables an operator to quickly develop an intuitive feel for the tactical situation within which his host warship resides.

At operation 106, curser 312 is displayed in fused sensor display 200, as depicted in FIG. 3. Specifically, curser 312 is depicted within radar view 204, although curser 312 can be positioned anywhere within fused sensor display 200. The position of curser 312 within radar view 204 is operator controlled. Curser 312 can be used to select either a contact indicator or contact image associated with a contact. When a contact is selected, an action specific to that contact is initiated. Examples of these actions include, without limitation, the display of detailed information about that contact in information display 208 or the display of changes to contact status, such as contact type or contact hostility assessment level. In some embodiments, curser 312 is used in outside view 206 to select sensor field-of-regard 424, redirect the pointing angle of a high-resolution display, change the zoom level (i.e., resolution) of a high-resolution display, and the like. Such changes are then reflected in the images displayed in information display 208.

At operation 107, weapon targeting indicator 308 is displayed in radar view 204. Weapon targeting indicator 308 denotes the field of fire for an anti-ship missile, and its position within the region of radar view 204 is controlled by an operator. The aim (i.e., azimuth and elevation) of the anti-ship missile is controlled by the horizontal and vertical position of weapon targeting indicator 308 in radar view 204. The position of weapon targeting indicator 308 is controlled by the operator with curser 312. In some alternative embodiments, weapon targeting indicator 308 denotes the field of fire for a different weapon, such as a machine gun, grenade launcher, and the like. In some alternative embodiments, weapon targeting indicator 308 is displayed in outside view 206 where it is controlled using curser 312, in similar fashion.

Surrounding weapon targeting indicator 308 is safety marker 310. Safety marker 310 denotes a region of safety around the field of fire for the missile. If a contact indicator for a friendly or unknown vessel is located outside the field of fire but within the azimuth limits of safety marker 310, the missile is not allowed to fire. Although the illustrative embodiment comprises a weapon targeting indicator that is displayed in the region of radar view 204, it will be clear to those skilled in the art, after reading this specification, how to make and use alternative embodiments of the present invention wherein weapon targeting indicator 308 is displayed within the region of outside view 206. In addition, it will be clear how to make and use alternative embodiments wherein the position of weapon targeting indicator 308 within fused sensor display 200 is determined by the aim of a weapon that is controlled independently of fused sensor display 200.

At operation 108, laser designation indicator 418 is displayed in outside view 206, as depicted in FIG. 4. The position of laser designation indicator 418 within outside view 206 determines the aim of a laser designator that is used to guide a laser-guided munition to a contact. As depicted in FIG. 4, laser designation indicator 418 is directed at contact image 404 (i.e., contact B). Since outside view 206 displays information from infrared sensors, the display shows the resultant illuminating laser spot 420 on contact image 404. In some alternative embodiments, laser designation indicator 418 does not control the aim of a laser indicator, but provides a passive indication of the aim of the laser designator. In some alternative embodiments, laser designation indicator 418 is displayed within the region of radar view 204.

At operation 109, tactical interaction indicator 422 is displayed in outside view 206, as depicted in FIG. 4. The position of tactical interaction indicator 422 within outside view 206 depicts the computer or operator assigned operational interaction between two or more contact images. In FIG. 4, the interaction is between contact images 408 and 410. Examples of these interactions include, without limitation, laser designation assignments, attack assignments, and battle damage assessment assignments. The pairing of contact images for tactical interaction indicators 422 is completed by the computer controlling fused sensor display 200 or manually by the operator using curser 312. In some alternative embodiments, tactical interactions indicators 422 are displayed between contact indicators in radar view 204 where they can be similarly controlled by either the computer or the operator with curser 312.

In the illustrative embodiment, radar view 204, outside view 206, information display 208, and azimuth indicator 202 are all displayed on a single display screen. Is some alternative embodiments, a plurality of screens are used to display portions of radar view 204, outside view 206, information display 208, and azimuth indicator 202, although the displayed portions remain correlated. For example, those portions of radar view 204, outside view 206, information display 208, and azimuth indicator 202 that pertain to azimuths on the port side of the host warship may be displayed on a screen located on the left side of a centerline that represent the bow of the warship. In similar fashion those portions of radar view 204, outside view 206, information display 208, and azimuth indicator 202 that pertain to azimuths on the starboard side of the host warship may be displayed on a screen located on the right side of the centerline. Both screens remain observable by a single observer, however.

Figure 5:
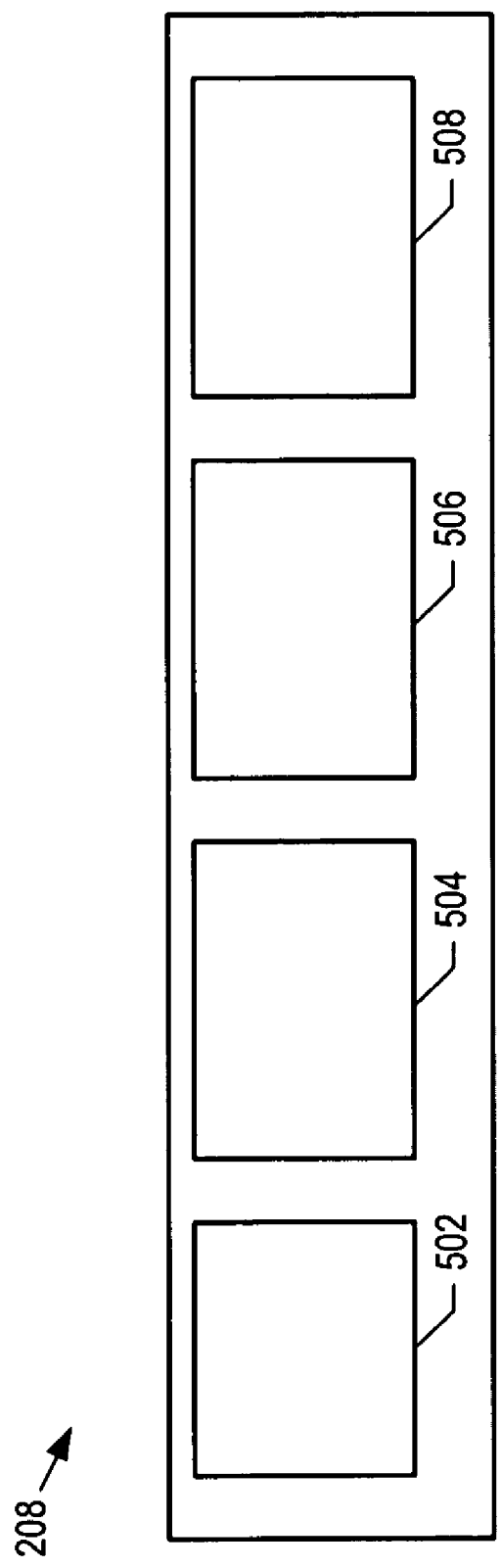
FIG. 5 depicts a schematic representation of information display 208 in accordance with the illustrative embodiment of the present invention.

FIG. 5 depicts a schematic representation of information display 208 in accordance with the illustrative embodiment of the present invention. Information display 208 comprises display areas 502, 504, 506, and 508. Each of these display areas is an area for displaying any type of available information deemed pertinent by one skilled in the art about one or more contacts in the field-of-interest. In some embodiments, information display 208 includes information about one or more contacts outside the field-of-interest. In some alternative embodiments, information display 208 includes information about the host warship or other friendly and/or non-threatening vessels. Information displayed in information display 208 may include:

i. contact information such as contact designation, classification, range, bearing, closing velocity, etc.; or ii. high-resolution images or video of a contact defined in a sensor field-of-regard 424; or iii. images or video of a contact provided by weapons targeting or laser designation equipment; or iv. medium-resolution images or video of a contact defined in a sensor field-of-regard 424; or v. historical information about a contact, such as pictures taken at times past, contact track data, etc.; or vi. threat level information about a contact; or vii. any combination of i, ii, iii, iv, v, and vi.

In some embodiments of the present invention, fused sensor display 200 also displays information and historical data about objects and/or vessels within the environment. In some embodiments, fused sensor display 200 provides this imagery and information in an azimuth correlated manner. In some embodiments, fused sensor display 200 comprises a single display screen of a suitable type. In some embodiments, sensor display area comprises a plurality of display screens of one or a plurality of suitable display screen types. Suitable display screen types include, without limitation, video displays, plasma displays, liquid crystal displays, and projection displays.

Although in the illustrative embodiment, the point-of-interest is a host warship, it will be clear to those skilled in the art, after reading this specification, how to make and use alternative embodiments of the present invention wherein the point-of-interest is an aircraft, a fixed ground installation, a land vehicle, or a space-based platform. It will also be clear how to make and use alternative embodiments wherein fused sensor display 200 is not co-located with the point-of-interest.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:

displaying an azimuth indicator, wherein the azimuth indicator spans a range of azimuths that corresponds to a field-of-interest, and wherein the range of azimuths is substantially continuous;

providing a first display area for displaying a view of the field-of-interest, wherein the view comprises information provided by at least one electro-optic sensor selected from the group consisting of cameras sensitive to visible light and cameras sensitive to infrared light;

providing a second display area for displaying a contact indicator for each of one or more contacts within the field-of-interest; and spatially correlating the azimuth indicator, first display area, and second display area.

2. The method of claim 1 further comprising linearly aligning the azimuth indicator, first display area, and second display area along a vertical line.

3. The method of claim 2 wherein spatially correlating the azimuth indicator, first display area, and second display area comprises spatially correlating the azimuth indicator, the width of the first display area, and the width of the second display area.

4. The method of claim 1 further comprising selecting the range of azimuths to include all azimuths within the range of approximately 0 degrees to approximately 360 degrees.

5. The method of claim 1 further comprising selecting the range of azimuths to include less than all azimuths within the range of approximately 0 degrees to approximately 360 degrees.

6. The method of claim 1 further comprising displaying a first contact indicator in the second display area, wherein the first contact indicator corresponds to a first contact within the field-of-interest.

7. The method of claim 6 further comprising displaying a first contact image in the first display area, wherein the first contact image corresponds to the first contact.

8. The method of claim 1 further comprising displaying a first contact indicator in the second display area, wherein the first contact indicator comprises a first shape, and wherein the first shape denotes a contact classification.

9. The method of claim 1 further comprising displaying a first contact indicator in the second display area, wherein the first contact indicator comprises a first color, and wherein the first color denotes a contact classification.

10. The method of claim 1 further comprising displaying a weapon pointing indicator at a first position in at least one of the azimuth indicator, first display area, and second display area, wherein the first position is spatially correlated to at least one of the azimuth and the elevation of a weapon.

11. The method of claim 10 further comprising controlling at least one of the azimuth and elevation of a weapon based on the first position.

12. The method of claim 1 further comprising displaying a laser designation indicator at a first position in at least one of the azimuth indicator, first display area, and second display area, wherein the first position is spatially correlated to at least one of the azimuth and elevation of a laser designator.

13. The method of claim 12 further comprising controlling at least one of the azimuth and elevation of a laser designator based on the first position.

14. The method of claim 1 further comprising providing a third display area for displaying information associated with at least one contact.

15. The method of claim 14 further comprising displaying historical information associated with a first contact in the third display area.

16. The method of claim 14 further comprising displaying tactical information associated with a first contact in the third display area.

17. A method for displaying information about a field-of-interest, relative to a point-of-interest, wherein the method comprises:
providing a first display area for displaying an azimuth indicator, wherein the azimuth indicator spans a range of azimuths that corresponds to the field-of-interest, and wherein the range of azimuths is substantially continuous, and further wherein the width of the first display area and the range of azimuths are spatially correlated;
providing a second display area for displaying a view of the field-of-interest; and
providing a third display area for displaying a radar image of the field-of-interest;
wherein the first display area, second display area, and third display area have substantially the same width, and wherein the first display area, second display area, and third display area are spatially aligned along the vertical direction, and further wherein the first display area, second display area, and third display area are spatially correlated.

18. The method of claim 17 further comprising:
displaying the azimuth indicator in the first display area, wherein the azimuth indicator spans the width of the first display area;
displaying the view in the second display area, wherein the view comprises information provided by at least one of a camera sensitive to visible light and a camera sensitive to infrared light;
displaying the radar image in the third display area; and
spatially correlating the azimuth indicator, the view, and the radar image.

19. The method of claim 17 further comprising selecting the range of azimuths to include all azimuths within the range of approximately 0 degrees to approximately 360 degrees.

20. The method of claim 17 further comprising selecting the range of azimuths to include less than all azimuths within the range of approximately 0 degrees to approximately 360 degrees.

21. The method of claim 17 further comprising displaying the radar image, wherein the radar image comprises a first contact indicator corresponding to a first contact within the field of interest, and wherein the first contact indicator comprises a shape that denotes a contact classification.

22. The method of claim 17 further comprising displaying the view, wherein the view comprises information provided by at least one electro-optic sensor.

23. The method of claim 22 further comprising selecting the at least one electro-optic sensor from the group consisting of a camera sensitive to visible light, a camera sensitive to infrared light, a visible light sensor, and an infrared light sensor.

24. The method of claim 17 further comprising:
displaying the azimuth indicator in the first display area;
displaying the radar image in the second display area, wherein the radar image comprises a first contact indicator corresponding to a first contact within the field of interest;
displaying the view in the third display area, wherein the view comprises a first contact image corresponding to the first contact; and
displaying a curser for selecting a contact by indicating one of an azimuth, a contact indicator, and a contact image, wherein the curser is displayed in at least one of first display area, second display area, and third display area.

25. The method of claim 24 further comprising:
selecting a contact;
selecting information corresponding to the contact; and
displaying the information in a fourth display area.

26. The method of claim 25 wherein the information is selected to comprise historical information.

27. The method of claim 25 wherein the information is selected to comprise tactical information.

28. A display comprising:
a first display area for displaying a contact indicator corresponding to each of one or more contacts within a field-of-interest;
a second display area for displaying a view of the field-of-interest from a point-of-interest; and a third display area for displaying an azimuth indicator, wherein the azimuth indicator is referenced to the point-of-interest and a reference direction;

wherein the first display area, second display area, and azimuth indicator are spatially correlated.

29. The display of claim 28 wherein the azimuth indicator spans an azimuth range that is substantially continuous and includes all azimuths within the range of approximately 0 degrees to approximately 360 degrees.

30. The display of claim 28 wherein the azimuth indicator spans an azimuth range that is substantially continuous and includes less than all azimuths within the range of 0 degrees to 360 degrees.

31. The display of claim 28 wherein the view comprises a contact image that corresponds to each of one or more contacts in the field-of-interest, and wherein a contact image and a contact indicator are spatially correlated when they correspond to the same contact.

32. The display of claim 28 wherein at least one contact indicator comprises a shape that denotes a target classification.

33. The display of claim 28 wherein at least one contact indicator comprises a color that denotes a target classification.

34. The display of claim 28 wherein the view comprises information from at least one of a camera sensitive to visible light and a camera sensitive to infrared light.

35. The display of claim 28 further comprising a weapon pointing indicator displayed at a first position within one of the first display area, second display area, and third display area, wherein the first position and at least one of the azimuth and elevation of a weapon are correlated.

36. The display of claim 35 wherein the first position is controllable, and wherein control of the first position controls at least one of the azimuth and elevation of the weapon.

37. The display of claim 28 further comprising a laser designator indicator displayed at a first position within one of the first display area, second display area, and third display area, wherein the first position and at least one of the azimuth and elevation of a laser designator are correlated.

38. The display of claim 37 wherein the first position is controllable, and wherein control of the first position controls at least one of the azimuth and elevation of the laser designator.

39. The display of claim 28 further comprising a curser for selecting a contact by indicating one of an azimuth, a contact indicator, and a contact image, wherein the curser is displayed in at least one of the first display area, second display area, and third display area.

40. The display of claim 39 further comprising a fourth display area for displaying information that corresponds to a selected contact.

* * * * *